United States Patent
Hickner et al.

[11] 3,734,572
[45] May 22, 1973

[54] ADAPTIVE BRAKING CONTROL SYSTEM USING PEAK WHEEL DECELERATION DETECTOR AND INITIAL HIGH SLIP

[75] Inventors: George B. Hickner; Michael Slavin, both of South Bend, Ind.; Donald W. Howard, Baltimore, Md.

[73] Assignee: The Bendix Corporation, South Bend, Ind.

[22] Filed: Dec. 7, 1970

[21] Appl. No.: 95,785

[52] U.S. Cl..............303/21 BE, 188/181 A, 303/20, 303/21 P
[51] Int. Cl...............................................B60t 8/12
[58] Field of Search..................303/20, 21 B, 21 BE, 303/21 BB, 21 EB, 21 CG, 21 P; 188/181 A; 324/162; 340/262

[56] References Cited

UNITED STATES PATENTS

| | | | |
|---|---|---|---|
| 3,656,817 | 4/1972 | Okamoto et al. | 303/21 P |
| 3,525,553 | 8/1970 | Carp et al. | 303/20 X |
| 3,494,671 | 2/1970 | Slavin et al. | 303/20 X |
| 3,532,392 | 10/1970 | Scharlack | 303/21 P |
| 3,532,393 | 10/1970 | Riordan | 303/21 BE |
| 3,604,761 | 9/1971 | Okamoto | 303/21 BE X |
| 3,604,762 | 9/1971 | Ando | 303/21 BE |
| 3,578,819 | 5/1971 | Atkins | 303/21 BE |

*Primary Examiner*—Robert J. Spar
*Attorney*—William N. Antonis and Plante, Hartz, Smith & Thompson

[57] ABSTRACT

A control portion of an adaptive braking system utilizing peak wheel deceleration to prevent the skidding of an automotive vehicle. The control portion assumes the vehicle is operating on a high coefficient surface for a first cycle of brake pressure modulation. After the first cycle of modulation, if the vehicle is operating on a low coefficient surface, appropriate logic will change the allowable percent slip to a lower value. Along with the initial high coefficient surface condition for the first cycle of brake pressure modulation is included a means to memorize the initial speed upon applying the vehicle brakes. The braked wheel is brought back to a given percentage of the initial speed by further decay of brake pressure during the first cycle of modulation.

2 Claims, 3 Drawing Figures

INVENTORS
GEORGE B. HICKNER,
DONALD W. HOWARD
BY & MICHAEL SLAVIN

ATTORNEY

ADAPTIVE BRAKING CONTROL SYSTEM USING PEAK WHEEL DECELERATION DETECTOR AND INITIAL HIGH SLIP

BACKGROUND OF THE INVENTION

The present application incorporates U. S. Pat. Nos. 3,494,671 and 3,525,553 which have the same assignee as the present invention.

The above-mentioned patents incorporated by reference should give a good description of the previous controls used in adaptive braking systems. Normally wheel acceleration is determined from the derivative of wheel speed. The wheel acceleration is then used to modulate the brake pressure to prevent a skidding condition by the automotive vehicle. In the previous systems when a predetermined value of wheel deceleration has been obtained, brake pressure would be decayed as long as wheel deceleration remains below that value. If wheel acceleration exceeds a predetermined level, then normal braking would be restored to the vehicle operator. Many other set points between these two values could be used to give a proportional type of control. If brake pressure is reduced as long as wheel deceleration exceeds the predetermined reference level, a great deal of braking effort may be lost. Because of the time period necessary to restore brake pressure, a better system would be one that terminates brake pressure decay at some point in time before wheel deceleration has returned to the predetermined reference level. Computer studies and test vehicles have proven that peak wheel deceleration is a very desirable point to terminate pressure decay. This results in increased braking effort with a faster restoration of brake pressure.

Prior systems that use acceleration response type of devices assume the vehicle to be operating on a low coefficient surface. If the vehicle is operating on a high coefficient surface, then during or after the first cycle the allowable percent slip is increased. This results in a loss of braking effort during the first cycle of operation on high coefficient surface conditions. Since a far greater percentage of vehicles are operated on high coefficient surfaces, this results in a significant reduction in the overall braking effectiveness. The present invention assumes for the first cycle that the vehicle is operating on a high coefficient surface. If this is incorrect, then on subsequent cycles of modulation the percent slip will be reduced which indicates operation on a low coefficient surface. Considering the average surface condition on which vehicles are operated, the overall braking effectiveness has been increased. If the vehicle is operating on a low coefficient surface, a speed memory with a percentage comparator has been included to insure that the vehicle wheel will return to some percentage of its initial velocity without cycling down to a locked wheel condition.

SUMMARY OF THE INVENTION

Accordingly, it is an object of this invention to provide a peak wheel deceleration detector to give an earlier termination of brake pressure decay thereby increasing overall braking effort.

It is another object of the present invention to utilize an acceleration responsive device to give an initial slip command that indicates operation on a high coefficient surface with a maximum braking effort.

It is still another object of the present invention to change the slip command from a high percent slip to a low percent slip after the first cycle of operation if the vehicle is being operated on a low coefficient surface.

It is an even further object of the present invention to include a speed memory and percentage comparator to insure that rotational velocity of the vehicle wheel returns to a percentage of its initial wheel velocity upon applying the vehicle brakes thereby preventing premature wheel lockup on low coefficient surfaces.

DESCRIPTION OF THE PREFERRED EMBODIMENT

Figure 1:
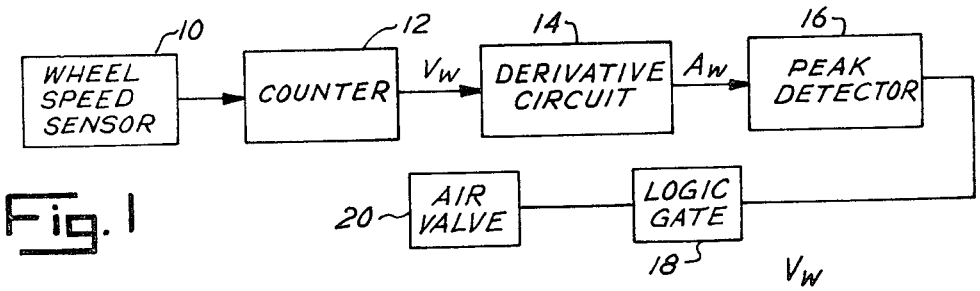
FIG. 1 is a block diagram of a portion of the adaptive braking controls utilizing a peak wheel deceleration detector in an adaptive braking system.

The essential elements for termination of brake pressure decay using a peak wheel deceleration detector are shown in FIG. 1. A wheel speed sensor 10 gives a pulsed output signal with the pulses being proportional to the rotational velocity of the vehicle wheel (not shown). The counter 12 converts the digital representation given by the pulses to an analog representation that is proportional to the rotational velocity $V_W$ of the vehicle wheel. The rotational velocity voltage output $V_W$ of counter 12 is fed into derivative circuit 14 to obtain wheel acceleration represented by $A_W$. The acceleration signal $A_W$ is fed into peak detector 16 that determines the point of maximum wheel deceleration. Though not specifically shown in the drawings for this application, the wheel acceleration signal $A_W$ feeds into other logic elements as shown in the incorporated patents. An output from the peak detector 16 feeds into logic gate 18. Logic gate 18 controls the operation of air valve 20 used to decay brake pressure. Logic gate 18 receives a number of other inputs with the ones shown in the incorporated references being a typical example of signals used to operate the air valve 20. However, once a predetermined signal is received from the peak detector 16 (representing maximum wheel deceleration), the logic gate 18 will close air valve 20 thereby preventing any further decrease in brake pressure.

Figure 2:
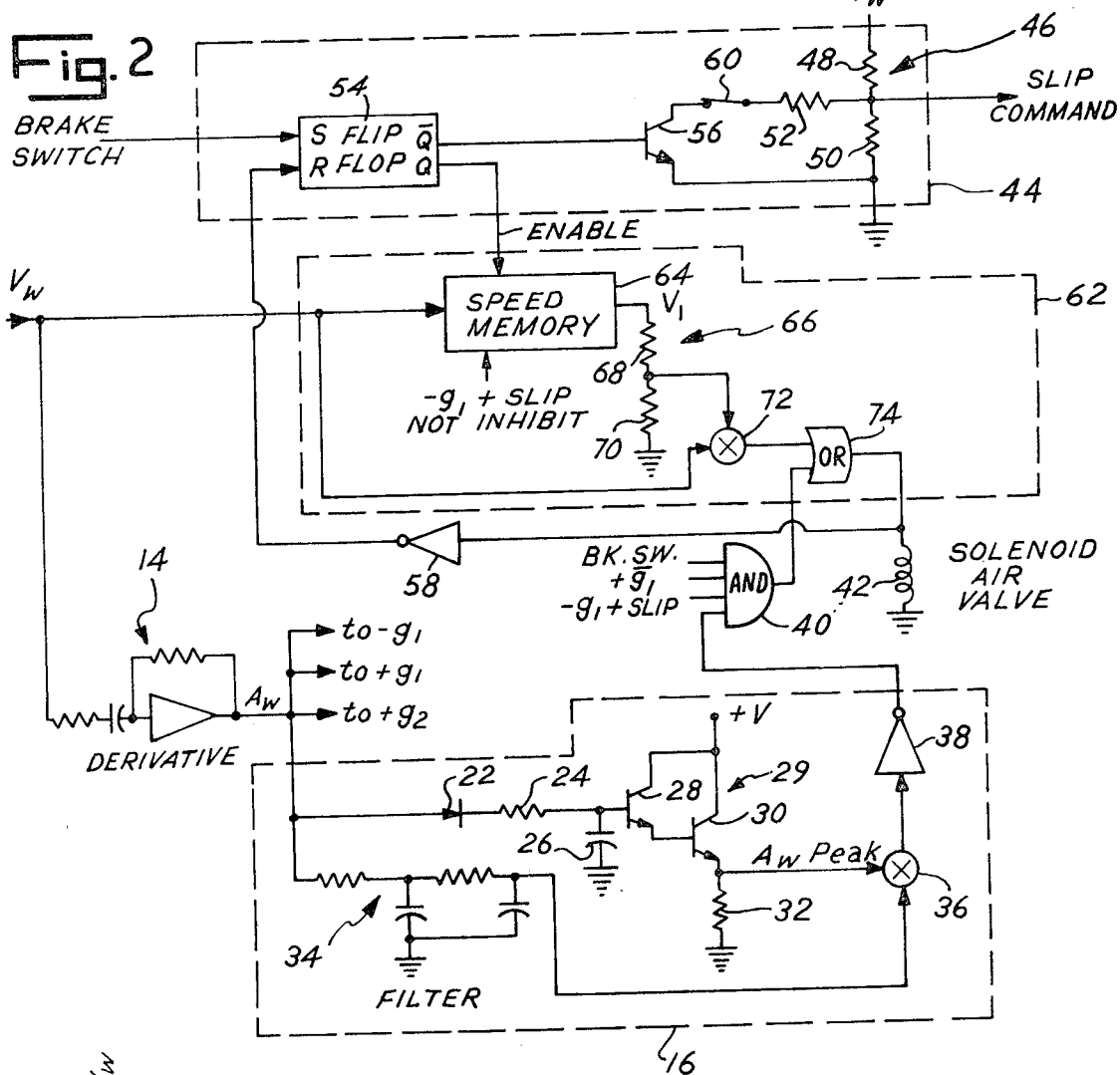
FIG. 2 is an illustrated schematic showing all the improvements of the present invention over the previously incorporated patents.

To explain in further detail the peak wheel deceleration detector 16, as shown in FIG. 1, and other aspects of the present invention, attention is directed to FIG. 2. A voltage signal proportional to rotational velocity of the vehicle wheels, which is the same as rotational velocity in FIG. 1, is again represented by $V_W$. The rotational velocity $V_W$ is determined by any appropriate means as shown in the prior art or the incorporated patents. A derivative circuit 14 converts the velocity signal $V_W$ into an acceleration signal $A_W$. The acceleration signal $A_W$ feeds to $-g_1$, $+g_1$ and $+g_2$ comparators as shown in the incorporated patents. Also, the acceleration signal $A_W$ feeds into the peak wheel deceleration detector 16 enclosed by dotted lines. When the acceleration signal $A_W$ goes in the negative direction to indicate a wheel deceleration, current will flow through diode 22 and resistor 24 to charge capacitor 26. The charge on capacitor 26 is connected to the input of an emitter follower 29 formed by transistors 28 and 30. The collectors of the emitter follower 29 are connected to a regulated DC supply represented by +V. The output current of the emitter follower 29 develops a voltage across resistor 32 that is essentially equal to the voltage developed across capacitor 26. The time constant for the charging of the capacitor 26 is determined by resistor 24 and capacitor 26. Diode 22 prevents discharge of capacitor 26 in one direction and emitter follower 29 provides isolation for the capacitor 26 in the other direction. The time constant for discharging capacitor 26 can be set at any desired value. For the purposes of this invention, the output voltage developed across resistor 32 will represent the peak wheel acceleration $A_W$. The wheel acceleration $A_W$ is also fed into a filter circuit 34 that removes unwanted noise and, simultaneously, allows the approximate wheel acceleration signal $A_W$ to be fed into comparator 36. The other input to comparator 36 is the peak wheel deceleration. When the peak wheel deceleration exceeds the actual wheel deceleration $(-A_W)$ as received through filter circuit 34, then a voltage output will be generated. To convert the voltage output from comparator 36 to the desired form for use in the incorporated patents, an inverter 38 is necessary. The output from inverter 38 feeds into AND gate 40 which can correspond to AND gate 82 or AND gate 95 of U. S. Pat. No. 3,494,671. The other inputs to AND gate 40, as described in the incorporated patent, would be a brake switch BK. SW., $+\overline{g}_1$ and $-g_1 +$ slip.

Under normal operation of the vehicle, if an imminent skid condition is sensed, a $-g_1 +$ slip signal is fed into AND gate 40. Since the brake switch input BK. SW. and $+\overline{g}_1$ are already being fed into AND gate 40 along with the output from inverter 38, AND gate 40 will give an output that energizes solenoid air valve 42. The energization of solenoid air valve 42 will result in a decrease in brake pressure as explained in incorporated patent. If the vehicle operator applies enough pressure to cause an imminent skid condition, the first input signal to be removed from AND gate 40 would be the signal from inverter 38 of peak wheel deceleration detector 16. This allows an earlier brake pressure decay termination which results in increased braking effort due to the finite time necessary to restore brake pressure.

Also included in the present invention is an initial high slip controller 44. The wheel velocity signal $V_W$ is fed into a voltage divider 46 formed by resistors 48 and 50. However, an alternate path as will be subsequently described, may connect resistor 52 in parallel with resistor 50 thereby changing the voltage divider network 46. The slip command which is taken from the junction of the voltage dividing network 46 is dependent upon whether resistor 52 is connected in parallel with resistor 50 thereby reducing the effective resistance. The slip command is used to control the g set points as described in the incorporated patents. When resistor 52 is not connected in parallel with resistor 50, the slip command has a higher voltage representation, and it is assumed by the control system that the vehicle is operating on a high coefficient surface. When resistor 52 is connected in parallel with resistor 50, the slip command is reduced, and it is assumed that the automobile is operating on a low coefficient surface.

The brake switch command feeds into initial high clip controller 44 to set flip-flop 54. When flip-flop 54 is set, the $\overline{Q}$ output drops to zero thereby preventing the conduction of transistor 56. With transistor 56 being non-conducting, resistor 52 is not connected in parallel with resistor 50. Therefore, a high slip command will be generated. However, once the solenoid air valve 42 has been de-energized, inverter 58 will reset flip-flop 54 to yield a $\overline{Q}$ output. Even though the set S and reset R signals for flip-flop 54 may co-exist immediately after the signal from the brake switch is received, the leading edge of a signal controls the operation of the flip-flop 54 so it will always be set upon receiving the brake switch command. The $\overline{Q}$ output starts conduction of transistor 56 which connects resistor 52 in parallel with resistor 50 if the acceleration responsive switch 60 has not opened. The acceleration responsive switch 60 may be of a type similar to the one shown in U.S. Pat. No. 3,525,553 which is normally closed when the vehicle is being braked on a low coefficient surface and opening only when the vehicle is being heavily braked on a high coefficient surface. Therefore, both acceleration responsive switch 60 must be closed and transistor 56 must be conducting before a low slip command will be received.

When operating on a low coefficient surface, it may be possible to lock the vehicle wheels during the first cycle of operation. To insure that a locked wheel condition does not occur during the first cycle of operation, especially on low coefficient surfaces, a percentage comparator 62 has been included. Within the percentage comparator 62 a speed memory 64 continuously receives the wheel rotation velocity signal $V_W$. Upon receiving an enable command which may be the Q output of flip-flop 54 or a direct input from the brake switch, the initial braking speed $V_I$ is memorized. Upon receiving a $-g_1 +$ slip which indicates that an imminent skid condition exists, the inhibit for speed memory 64 is removed and an output feeds into voltage divider 66 formed by resistors 68 and 70. The voltage developed at the junction of resistors 68 and 70 represents a percentage of the initial rotational velocity signal $V_I$ of the vehicle wheel. The percentage of this initial velocity $V_I$ which has been previously set by resistor 68 and 70 is fed into comparator 72. The other input to comparator 72 is the velocity of vehicle wheel $V_W$. The comparator 72 gives an output as long as the actual wheel velocity $V_W$ is less than the percentage set by the voltage divider 66 of the initial velocity $V_I$ contained in speed memory 64. The output from comparator 72 feeds into OR gate 74 along with the output of AND gate 40. Therefore, AND gate 40 may indicate a termination of brake pressure decay by a loss of voltage output, but the output from comparator 72 will keep the solenoid air valve 42 in the energized state.

Figure 3:
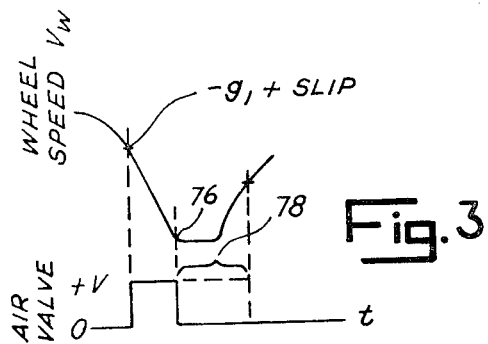
FIG. 3 is a graphic illustration of how the speed memory shown in FIG. 2 extends the brake pressure decay for the first cycle to insure the return of the vehicle wheel to a percentage of its initial speed.

A graphic illustration of the operation of the solenoid air valve is shown in FIG. 3. As the wheel speed goes through $-g_1 +$ slip, the air valve 42 is energized. Normally the solenoid air valve would be de-energized at the point of maximum wheel deceleration 76 but the output from comparator 72 maintains the solenoid air valve 42 in the energized state as shown by the dotted portion 78. It should be emphasized at this point that $-g_1 +$ slip is necessary before a speed memory output can be fed to voltage divider 66. However, the speed memory output $V_I$ is not removed until the enable is also removed, even though $-g_1$ + slip may no longer exist.

As an additional fail-safe feature, speed memory 64 may have a time delay to remove $V_I$ if the enable signal has not been removed, i.e., flip-flop 54 reset, within a given time period. An example of such a case where no brakes could otherwise result would be where a vehicle has significantly reduced its speed between the time the brake switch command is received and before a skid condition results, i.e., $-g_1$ + slip. Therefore, $V_W$ would never exceed $V_I$ to de-energize solenoid air valve 42 which reduces brake pressure without removing $V_I$. The percentage comparator 62 which receives its enable from flip-flop 54 will only give an output during the first cycle of modulation to maintain the solenoid air valve 42 in the energized state. When flip-flop 54 is set, the comparator output is at a zero voltage level allowing solenoid air valve 42 to be controlled by AND gate 40.

If, in the middle of an adaptive braking cycle, the vehicle moves from a high coefficient surface to a low coefficient surface, the change of state by the acceleration responsive switch 60 can be used to reset the speed memory 64 through flip-flop 54. An OR gate at the set S input would accept either brake switch BK. SW. or the change of acceleration responsive switch 60 to set flip-flop 54. Now the initial speed $V_I$ contained in speed memory 64 would be the speed where the vehicle moves from a high coefficient to a low coefficient surface.

We claim:

1. In a vehicle having a wheel and a brake controlling said wheel, an adaptive braking system for controlling said brake to prevent skidding of said wheel comprising:

modulating means responsive to a control signal for relieving braking pressure communicated to said controlled wheel; and control means for generating said control signal, said control means including means responsive to acceleration and deceleration of said vehicle wheel for generating acceleration and deceleration signals proportional to acceleration and deceleration of said vehicle wheel, means for generating said control signal when said deceleration signal exceeds a predetermined value whereupon said controlled wheel continues to decelerate to a maximum deceleration level due to the response time of said adaptive braking system and thereafter said controlled wheel accelerates, said deceleration signal attaining a peak value when said controlled wheel attains the maximum deceleration level, and means responsive to the peak value of said deceleration signal for extinguishing said control signal;

said last-mentioned means including a device for storing the instantaneous value of said deceleration signal, and means comparing the instantaneous value of said deceleration signal and generating an output signal when the instantaneous value becomes less than the stored value, said output signal being effective to extinguish said control signal.

2. The invention of claim 1:

means for inverting the value of said output signal;

said control means including gating means responsive to a plurality of input signals to generate said control signal, said input signals including said inverted value of said output signal and a signal generated when the value of said deceleration signal exceeds said predetermined value.

* * * * *